United States Patent

[11] 3,533,343

[72] Inventors Tatsuo Kobayashi
 Kaizuka, Osaka;
 Hiroshi Ueda, Nara, Japan
[21] Appl. No. 760,810
[22] Filed Sept. 19, 1968
[45] Patented Oct. 13, 1970
[73] Assignee Minolta Camera Kabushiki Kaisha
 Osaka, Japan
[32] Priority Sept. 23, 1967, Sept. 27, 1967, Oct. 27, 1967
[33] Japan
[31] Nos. 42/61102, 42/62112 and 42/69218

[54] ROTARY MIRROR SHUTTER
 6 Claims, 4 Drawing Figs.
[52] U.S. Cl. .................................................. 95/42, 95/58
[51] Int. Cl. ......................................... G03b 19/12
[50] Field of Search .......................... 95/42, 58

[56] References Cited
 UNITED STATES PATENTS
2,827,839 3/1958 Fuerst ........................ 95/58
2,933,995 4/1960 Hino ........................... 95/42

Primary Examiner—John M. Horan
Assistant Examiner—Richard L. Moses
Attorney—Waters, Roditi, Schwartz and Nissen ABSTRACT: A rotary mirror shutter having a leading shutter member consisting of a light-intercepting drum with a mirror mounted on the top thereof and a succeeding shutter member consisting of another light-intercepting drum to be actuated with a time lag from the start of said leading shutter member. Both shutter members are pivotally mounted on a shaft of a shutter housing. One side wall of the shutter housing has a driving lever for driving the leading shutter member and a stop lever for actuating the operation of shutter quick return. The stop lever operatively engages the driving lever and is released upon completion of the rotation of the two shutter members. The bottom wall of the shutter housing has a stop arm for holding the actuation of the succeeding shutter member after the start of the leading shutter member and a shutter speed regulating means. The shutter speed regulating means releases the holding of said succeeding shutter means by the stop arm at a moment corresponding to a predetermined shutter speed.

ROTARY MIRROR SHUTTER

This invention relates to a rotary mirror shutter, and more particularly to a rotary mirror shutter of the so-called drum type shutter having a leading shutter member with a light-intercepting drum of a certain curvature and a succeeding shutter member, both said shutter members pivotally mounted on a common shaft of shutter housing, wherein said succeeding shutter member follows the rotation of said leading shutter member in the same direction with a certain presettable time lag, so that a desired exposure can be provided for each photographic film.

The rotary mirror shutter of the invention is particularly suitable for the use in a monocular reflex camera, and by mounting the leading shutter member on a mirror of any monocular reflex camera, the mirror can be used as a shutter element as well as a reflecting member. Thereby, a separate focal plane shutter or a lens shutter can be dispensed with from the camera, and the number of parts of the camera is greatly reduced to allow cost reduction. Moreover, it is possible to eliminate the mirror-up time in such monocular reflex camera, from depression of a release button to the beginning of exposure, and hence, pictures with little time lag can be achieved.

In a known rotary mirror shutter of simple type, the shuttering operation is carried out merely by opening and closing a mirror having a light-intercepting drum. Except such simple type, there are roughly two groups of known rotary mirror shutters: namely, a first type in which operative members of the shutter rotates upwards for exposing the film to light beams from a photographic object, when it is held vertically. And another type in which operative members of the shutter rotates downwards for exposing the film to a photographic object, when it is held vertically one of the typical cameras of the second type is disclosed in U.S. Pat. No. 2,933,995 and German Pat. No. 1,093,197, both to the present inventors.

The aforesaid first type rotary mirror shutter has an advantage in having very little time lag, but it has a fatal disadvantage in its difficulty for quick return operation, and in fact, most shutters of the first type return the mirror at the time of winding up the shutter and eliminate quick return of the shutter. Some rotary mirror shutters of the first type are adapted to perform quick return, but in such shutters the adjustment of shutter speed is difficult, and hence, there have not been any rotary mirror shutters of the first type with freely adjustable shutter speed setting.

The aforesaid second type rotary mirror shutter can comparatively easily provide for the quick return operation, but it does not have the advantage of short time lag any more, and in addition, with the second type shutter, it is comparatively difficult to insure uniform exposure across the entire span of the film, as compared with the first type shutter. The difficulty in the uniformity of the exposure is due to the fact that the light-intercepting plane of the shutter is curved, and in the case of the second type including the downward shuttering movement of the light-intercepting plane, the movement of the light-intercepting plane is accelerated toward the lower end of the shuttering operation, and at the same time a slit provided in the plane for exposure is inclined to reduce the effective light-passing width thereof. Thus, in general, the exposure at the lower end portion of the film tends to be insufficient or less than that at the upper end thereof. Accordingly, high speed shuttering with a reduced slit width is very difficult to attain with such second type rotary mirror shutter.

Generally speaking, the effective exposing time $t_o$ of a so-called mirror shutter is given by $t_o = w/v$, wherein $w$ represents the effective width of a slit and $v$ represents the velocity of the slit, as in the case of known focal plane shutter. In the aforesaid second type rotary mirror shutter, the slit velocity $v$ is accelerated at the lower portion of the film as compared with the upper portion thereof, and the slit is slanted with respect to the optical axis of light beams from the photographic object to reduce the effective width $w$ thereof. Thus, it is apparent that the effective duration of exposure at the lower portion of the film is reduced as compared with that at the upper portion thereof. The foregoing description assumes that the actual physical width of the slit is constant. In order to eliminate the unevenness of exposure with the aforesaid second type rotary mirror shutter, it is expedient to devise a special construction or a control means of the driving mechanism of the leading and succeeding shutter members.

The rotary mirror shutter of the second type can do with a small space within the camera, and in addition, it has simple construction to allow manufacture at low cost. However, it has not been utilized so extensively heretofore. The reason for it is in that the shutter speed is not very stable, as compared with that of focal plane shutters. Such lack of stability of the shutter speed is not caused by the time lag from the rotation of the leading shutter member to the beginning of the rotation of the succeeding shutter member, but by the relative speed between the two members, i.e. the width of the exposure slit during the shutter operation. In other words, the velocities of individual shutter members affect the stability of the shutter speed. The velocity of each shutter member is determined by various factors, such as its mass (moment of inertia), the strength of the driving force source, the position of its center of gravity (resistance due to gravitational force), air pressure, mechanical frictions related to the moving elements, etc. To achieve stable shutter speed, the two shutter members should be so designed as to have substantially the same rotating speed by adjusting the aforesaid various factors which are different from each other.

Among those factors, the center of gravity of each shutter member cannot be positioned at the center of rotation of the shutter member, due to the limitation from the standpoint of the shutter construction. Besides, the locus of the movement of the shutter members cannot be so selected as to coincide with each other. Thus, with a camera having a known rotary mirror shutter of such construction, when the angular posture of the camera is changed, the resistance due to gravity is also changed to vary the speed of each member, and accordingly, the exposure becomes uneven over the entire expanse of the film. Such phenomenon becomes more apparent as the shutter speed increases. For the purpose of diminishing the effects of the gravity at high shutter speeds, it is possible to reduce the mass of each shutter member while increasing the strength of a driving force source and reducing the air pressure, but there is a certain limitation in such measures from the structural view point. In known rotary mirror shutter of the type, the only speed regulating means provided therein acts to vary the delayed starting time of the succeeding shutter member after the rotation of the leading shutter member, and hence, it has been impossible to stabilize the shutter speed at high speed settings.

Recently, in order to simplify the process of mounting film on a camera, special magazines loaded with films have been widely used, e.g. magazines having 35 mm wide films with a perforation for each photographic frame, and such magazine has a pair of spaced chambers each of which accommodates a cartridge, for retaining unexposed and exposed portions of the film, respectively, which chambers are spaced only narrowly due to economical and handling reasons. The film held by such magazine does not have much marginal spaces on either side thereof. In addition, light-intercepting ribs project from the magazine between the two chambers at right angles with the film surface, to improve the mechanical strength and the light-intercepting ability when it is mounted in a camera. Such magazine chambers and ribs reduce the space available for other mechanisms of the camera in the case of cameras using magazine-mounted films. Especially, in the case of monocular reflex camera, the use of focal plane shutter becomes difficult, and hence, one has to use lens shutters, which make the camera construction complicated and necessitate an additional mechanism related to interconnection between a mirror and the shutter.

Therefore, an object of the present invention is to obviate the aforesaid difficulties of known rotary mirror shutters by providing an improved rotary mirror shutter of simple construction, in which the duration of exposure for the lower portion of the film is compensated for by increasing the effective width of the slit in response to the increase of the slit velocity, so as to insure even exposure over the entire expanse of the film in a simple and reliable manner, while allowing quick return and free selection of shutter speed in a wide range, such as one-thirtieth to one two-hundred-fiftieths of a second.

Another object of the present invention is to provide an improved rotary mirror shutter of the aforesaid type having a shutter speed stabilizing means, in which the width of the exposing slit formed between a leading shutter member and a succeeding shutter member is fixed or semifixed, so as to enable the use of a shutter speed as high as possible, for instance in a range of one five-hundredths to one one-thousandth of a second.

A further object of the present invention is to provide a rotary mirror shutter of the aforesaid type, in which shutter speed control means are disposed on the lower surface of a shutter housing, while keeping the side surfaces, especially the proximities of film, free from congested arrangement of various components of the shutter.

It is another object of the present invention to provide an improved rotary mirror shutter of the aforementioned type adapted to allow the full-open of the shutter by releasing the control engagement of the succeeding shutter element through a mechanical route different from that of a shutter speed regulating means.

A still different object of the present invention is to provide an improved rotary mirror shutter of the preceding type, in which film detect signals are produced in a stable and reliable manner by actuating a film detecting member in certain relation with the shutter quick return operation for locating perforations formed on a film mounted in magazines.

Other objects and a fuller understanding of the present invention may be had by referring to the following description, taken in conjunction with the accompanying drawings, in which.

Figure 1:
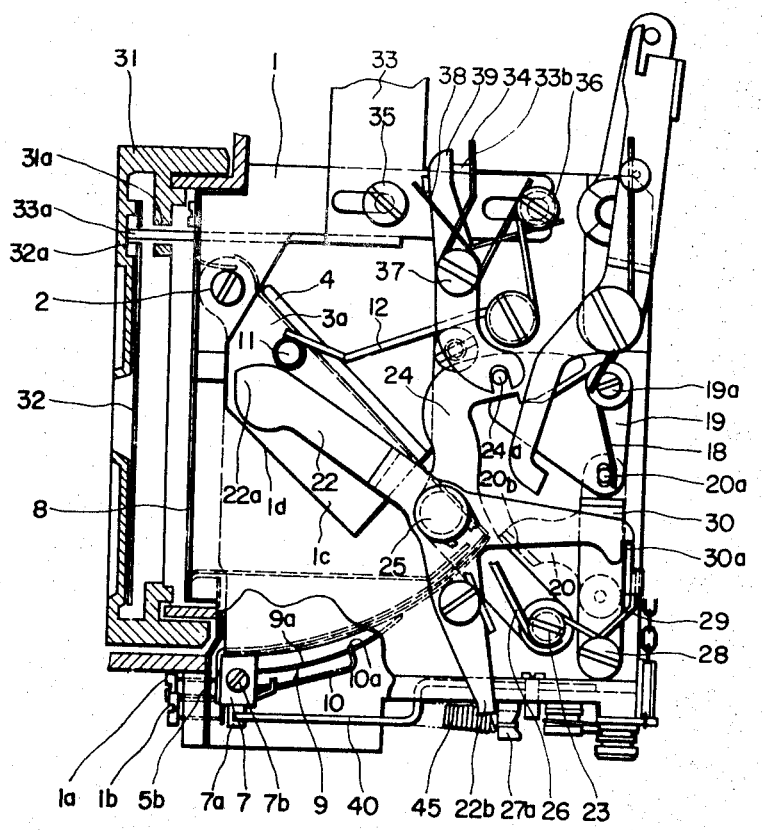
FIG. 1 is a schematic side view, with a part in section, of a rotary mirror shutter, according to the present invention, shown in the state as mounted on a monocular reflex camera which is adapted to use magazine-mounted films.
Figure 3:
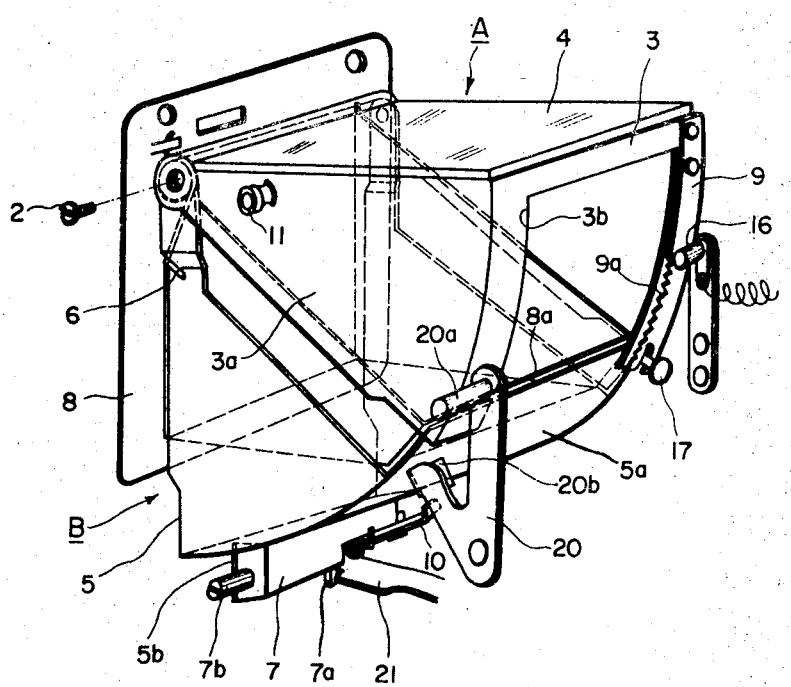
FIG. 3 is a schematic perspective view of essential portions of the rotary mirror shutter, shown in the state as fully opened with the housing cut away.

Referring to FIG. 1, a shutter housing 1 has a shaft 2 secured thereto, and a leading shutter member A and a succeeding shutter member B are pivotally mounted on the shaft 2 as shown in FIG. 3. The leading shutter member A comprises a light-intercepting drum 3 with light-intercepting side plates 3a and an opening 3b to receive light beams, and a mirror 4 disposed on the top surface of the drum 3. The succeeding shutter member B comprises a rotary light-intercepting plate 5 having a curved light-intercepting plate 5a formed at the same radius of curvature with that of the opening 3b of the drum 3. The mirror housing 1 will be so mounted on the camera body that a suitable range finder glass (not shown) will be disposed about the upper surface of the shutter housing 1, and a photographing lens means (not shown) is placed in front of the housing 1, while a film 32 (FIG. 1) is at the back thereof. A spring 6 is mounted on the shaft 2 so as to bias the light-intercepting rotary plate 5 in a counterclockwise direction, as seen in FIG. 3, and the leading shutter member A is adapted to optically cover the succeeding shutter member B. A weight piece 7 is secured to a bent portion 5b formed at the lower end of the rotary light-intercepting plate 5, so as to make the moment of inertia of the succeeding shutter member B about the same as that of the leading shutter member A. The weight piece 7 has a lug 7a to stop the aforesaid succeeding shutter member B with a time lag to be described later as well as a pin 7b for actuating the quick return operation of the mirror. An inner light-intercepting framework 8 is secured to the shutter housing 1 and has an exposing frame 8a integrally formed therewith and extended into the inside of the aforesaid succeeding shutter member B.

Figure 4:
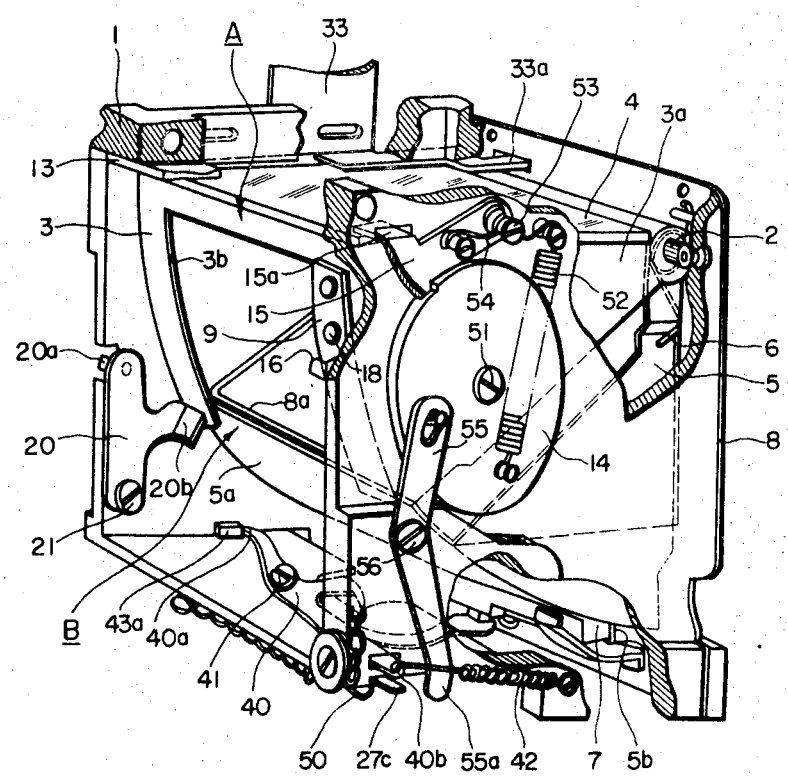
FIG. 4 is a schematic view of the essential portion of the rotary mirror shutter, shown in the state just prior to the full-open position.

On the other hand, the leading shutter member A is supported by the housing 1 in a lightproof manner and biased clockwise, as seen in FIG. 1, by the engagement between a pin 11 secured to the slide plate 3a of the shutter member A and a return spring 12 secured to the housing 1. A first adjusting screw 1a is provided at the lower end of the housing 1, so as to adjustably engage with the lower end of the leading shutter member and to keep a mirror 4, secured to the upper end of the member A, at an angular position intersecting the optical axis of the light beams entering into the shutter. A resilient member 13 (FIG. 4) is secured to the housing 1 at the upper end thereof and absorbs mechanical shock when the leading shutter member A dashes to its uppermost position. As shown in FIG. 4, a flywheel 14, acting as a delay member and adapted to cause the rotary mirror shutter to open in full, is rotatably mounted on the housing 1, and a lock lever 15 is so disposed that it engages the flywheel 14 when the leading shutter member A is at the uppermost position thereof.

Figure 2:
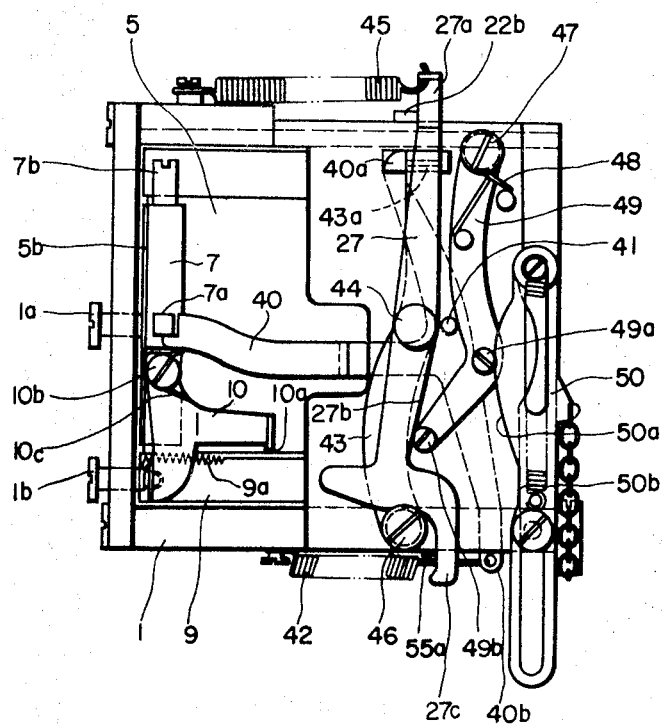
FIG. 2 is a bottom view of the shutter of FIG. 1, shown in the state after completing the shutter charging.

Referring to FIG. 2, as a shutter speed stabilizing means, a claw member 10 having a claw 10a is pivotally mounted to the weight piece 7 of the succeeding shutter member B by a pin 10b, and the claw member 10 is biased clockwise, as seen in the figure, by means of a spring 10c. Referring to FIGS. 2 and 3, a leaf spring 9 having notches 9a engageable with the aforesaid claw 10a is riveted to the leading shutter member A at one end thereof in such manner that the opposite end of the leaf spring 9 is biased away from the shutter member A so as to engage the head portion of a pin 17 secured to the shutter member A. The position of the leaf spring 9 relative to the shutter member A is such that it never interferes with the light beams coming from the photographing lens to the opening 3b of the shutter member A. The aforesaid claw member 10 is preset by a second adjusting screw 10b adjustably mounted at the lower end of the shutter box 1 in such fashion that unless the shutter is actuated, the claw 10a is kept away from the locus of the movement of the notches 9a of the leaf spring 9, and accordingly the claw 10a is not engageable with the notches 9a when the shutter is not actuated. Upon actuation of the shutter, the claw 10a of the claw member comes into engagement with the notches 9a of the leaf spring 9, and such engagement is adapted to be released when the leading shutter member A moves across light beams exposing the film 32 disposed behind the exposing frame 8a secured to the shutter housing 1. Such releasing of the engagement between the claw 10a and the notches 9a is carried out as follows: namely, as the leading shutter member A approaches to its uppermost position, the leaf spring 9 comes into engagement with a pin 16 secured to the shutter housing 1, and the further rotation of the leading shutter member A causes the free end of the notched portion of the leaf spring 9 toward the center of rotation of the shutter member A, while leaving the claw 10a of the claw member 10 at a fixed distance from the center of rotation, and hence the notches 9a are eventually separated from the claw 10a.

In FIG. 1, a stopper plate 9 is pivoted to the outer surface of the shutter housing 1 by a pin 19a and biases in a clockwise direction by a spring 18. In order to actuate the stopper plate 19 upon completion of the rotation of the succeeding shutter member B, a swingable lever 20 is pivoted to the inner surface of the shutter housing 1 by a spindle 21, as shown in FIG. 4. The swingable lever 20 has a pin secured to one end thereof and fitted in a notch formed on the stopper plate 19, and the swingable lever 20 also has a bent portion 20b formed at the opposite end thereof and engageable with the pin 7b of the aforesaid weight piece 7 upon completion of the rotation of the succeeding shutter member B.

In FIG. 1, a stopper lever 24 is pivotally mounted on the outer surface of one side wall of the shutter housing 1 by a shaft 23. A driving lever 22 is pivotally secured to the stopper lever 24 by a pin 25, so that the upper end 22a of the driving lever 22 engages the pin 11 and urges the leading shutter member A, counterclockwise by a driving spring 26 against the aforesaid return spring 12 acting in a clockwise direction. The effective spring force acting at the pin 11 caused by the driving spring 26 is selected to be larger than another effective spring force at the same pin 11 due to the return spring 12. The portion of the upper end 22a of the driving lever 22 is so shaped as to effectively utilize the actuating force of the driving spring 26 when the leading shutter member A reaches its uppermost position, to allow the setting of the actuating force of the driving spring 26 at a value as small as possible, and to prevent the leading shutter member from bounding. The driving lever 22 has a lower end 22b engageable with a swingable speed regulator lever 27 (best shown in FIG. 2) at one end 27a thereof. The driving lever 27 also has an intermediate projection engageable with the bent portion 30a of a release lever 30, which is biased counterclockwise by a spring 29 mounted on a shaft 28 when the shutter is charged, as shown in FIG. 1. Thus, under such conditions, the engagement between the release lever 30 and the driving lever 22 prevents the clockwise rotation of the driving lever 22.

The upper end 22a of the driving lever 22 fits in an opening 1c formed on the side wall of the shutter housing for the purpose of avoiding the film cartridge chamber of a magazine 31. When the shutter is charged to rotate the driving lever 22 in a counterclockwise direction, as seen in FIG. 1, the upper end 22a of the lever 22 engages an edge 1d of the opening 1c and acts to rotate the stopper lever 24 clockwise until the lever 24 comes into operative engagement with the other stopper lever 19. At the same time, the intermediate projection of the driving lever 22 engages the bent portion 30a of the release lever 30. Upon the release of the shutter, the driving lever 22 rotates clockwise to actuate the leading shutter member A, and when the shutter member A comes to the proximity of the uppermost position thereof, it is held and stopped by the stopper lever 24.

It is apparent to those skilled in the art that upon the release of the shutter, both the leading shutter member A and the succeeding shutter member B should rotate at substantially the same revolving speed, by properly selecting the elasticity of the spring 6, the return spring 12, and the driving spring 26, as well as the moments of inertia of various elements related to the operation of the shutter.

Again referring to FIG. 1, a detect member 33 to detect the perforation of the film 32 for producing a film feeding order signal is mounted on the upper end of the aforesaid one side of the shutter housing 1. The detect member 33 has a probe 33a which extends through a hole 31a bored on the magazine 31 to find out each perforation 32a bored on the film 32 one for every photographic frame thereof, which probe 33a is always urged toward the film 32 by a bias spring 34. The detect member 33 is adapted to slidingly reciprocate toward and away from the magazine 31 under the guidance of guide pins 35 and 36, and the film feeding order signal is given by transferring the displacement of the detect member 33 to a suitable film feeding mechanism (not shown). A link lever 39 is pivotally mounted on a shaft 37 secured to the side plate of the shutter housing 1, and the lever 39 is biased clockwise, as seen in FIG. 1, by another bias spring 38. The detect member 33 has a bent portion 33b engaged with the upper end of the link lever 39, so that the movement of the detect member 33 is transferred to the stopper lever 24 through the link lever 39 having a bifurcated lower end which engages a pin 24a secured to the stopper lever 24. The detect member 33 can freely move toward the film 32, as long as the stopper lever 24 is at the stop position, as shown in FIG. 1, but when the shutter is under the quick return mode of operation with the stopper lever 24 moving in a counterclockwise direction, the probe 33a is forced to move away from the perforation 32a. The position of the probe 33a in the shutter is such that it never interferes with the light beams from the mirror 4 (FIG. 3) to the range finder, and the probe 33a is also spaced from the operating range of the leading shutter member A.

Referring to FIG. 2, a shutter speed regulating mechanism is disposed on the bottom surface of the shutter housing 1. A stop arm 40 is pivotally mounted on a shaft 41 secured to the housing 1 and biased clockwise, as seen in the figure, by a coiled spring 42, so as to engage the pin 7a formed at the weight piece 7 of the succeeding shutter member B for limiting the movement of the member B. The swingable speed regulating lever 27, engaging the lower end 22a of the driving lever 22 as described in the foregoing, is pivotally connected to a pin 44 secured to an actuating lever 43 for actuating the stop arm 40, and the lever 27 is biased counterclockwise, as seen in the figure by another coiled spring 45. The actuating lever 43 has a bent end portion 43a operatively engaged with one end 40a of the stop arm 40, and the opposite end of the actuating lever is pivoted to a shaft 46 fastened to the shutter housing 1. The clockwise movement of the actuating lever 43, as seen in FIG. 2, is limited by the aforesaid shaft 41. A shutter speed regulating lever 49 is pivotally mounted on the shaft fixed to the housing 1, together with a biasing spring 48 urging the regulating lever 49 in a counterclockwise direction, as seen in FIG. 2. A pair of regulating pins 49a and 49b are secured to the shutter speed regulating lever 49, of which the regulating pin 49a engages the cam surface 50a of a shutter speed regulating cam member 50 in such a manner that as the regulating pin slides along the cam surface 50a, the distance between the side edge 27b of the swingable speed regulating lever 27 and the other regulating pin 49b varies. In the course of the shutter operation, the side edge 27b rotates counterclockwise around the pin 44 until it abuts the regulating pin 49b, and thereafter the swingable speed regulating lever 27 rotates counterclockwise around the regulating pin 49b, by the spring 45, so as to cause the counterclockwise rotation of the actuating lever 43 around the shaft 46 by means of the pivotal connection between the regulating lever 27 and the actuating lever 43 through the pin 44.

Referring to FIG. 4, the flywheel 14 is pivotally mounted on a shaft 51 secured to the shutter housing 1 on the opposite side to the driving lever 22, and a spring 52 is inserted between the shutter housing 1 and the flywheel 14 to bias the flywheel counterclockwise, as seen in the figure. The counterclockwise rotation of the flywheel 14 is limited by the engagement between the flywheel itself and the lock lever 15, which is pivotally mounted on a shaft 53 fastened to the shutter housing 1. The lock lever 15 is biased counterclockwise by a spring 54 and has a bent portion 15a extended into the shutter housing 1, so as to engage the leading shutter member A when the member A comes to its uppermost position. When the leading shutter member A passes across the light beams leading to the film 32, the engagement between the member A and the bent portion 15a of the lock lever is established to release the lock lever 15 from the flywheel 14. Thus, the flywheel 14 begins to rotate in a counterclockwise direction, and as a result of it, a link lever 55 rotates clockwise around a shaft 56. After a while, the lower end 55a of the link lever 55 strikes a biased end 40b of the stop arm 40, and hence the stop lever rotates clockwise, as seen in FIG. 4, around the shaft 41, to release the stop arm 40 from the engagement with the succeeding shutter member B. Thus, the full-open of the shutter is made possible. During the shutter charging, the link lever 55 is forced in the opposite direction by a free end 27c of the swingable speed regulating lever 27.

When the cam member 50 for shutter speed regulation is so set as to bring the regulating pin 49a of the shutter speed regulating lever 49 into engagement with a linear portion 50b of the cam surface, the other regulating pin 49b is further spaced from the side edge 27b of the swingable speed regulating lever 27, as seen from FIG. 2. Under such conditions, during the shutter operation, the rotation of the flywheel 14 actuates the stop arm 40 of the succeeding shutter member B through the link lever 55 at the lower end 55a thereof, but the free end 27c of the swingable speed regulating lever 27 is, in this case, so positioned as to escape from the biased end 40b of the stop arm 40. During charging of the shutter, the flywheel 14 is rotated clockwise against the elasticity of the coiled spring 52 through the driving lever 22, the swingable speed regulating lever 27, and the link lever 55, until it engages the lock lever 15.

In operation of the rotary mirror shutter of the aforesaid construction, according to the present invention, upon depression of a shutter lever (not shown), the release lever 30 rotates clockwise against the elasticity of the spring 29 to release the engagement between the release lever 30 and the driving lever 22. The driving spring 26 now forces the driving lever 22 clockwise to actuate the leading shutter member A to rotate counterclockwise by the engagement with the pin 11 secured to the side plate 3a of the shutter member A. Such rotation of the driving lever 22 allows the counterclockwise rotation of the swingable speed regulating lever 27, as seen in FIG. 2, around the pin 44 by the movement of the lower end 22b of the lever 22 engaged with the biased end 27a of the other lever 27. The coiled spring 45 drives such counterclockwise rotation of the swingable speed regulating lever 27. When the side edge 27b comes into contact with the regulating pin 49b secured to the shutter speed regulating lever 49, and thereafter, the swingable regulating lever 27 continues its counterclockwise rotation around the regulating pin 49b to cause the similar rotation of the actuating lever 43 around the shaft 46 by the pivotal connection between the levers 27 and 43 at the pin 44. Accordingly, the bent portion 43a of the actuating lever 43 urges the tip 40a of the stop arm 40, as seen in FIG. 2, so as to cause the counterclockwise rotation of the stop arm 40 around the shaft 41 against the elasticity of the coiled spring 42, until the engagement of the stop arm 20 with the pin 7a secured to the weight piece 7 of the succeeding shutter member B is released. Thus, the succeeding shutter member B begins to follow the leading shutter member A by means of the spring 6.

In the course of the above operation, if the position of the cam member 50 for regulating shutter speed is such that the regulating pin 49b is located closer to the side edge 27b of the swingable regulating lever 27, the interval between the actuation of the succeeding shutter member B and the start of the leading shutter member A is shortened, and hence, the width of an exposing slit defined by the two shutter members A and B decreases, resulting in a higher shutter speed. On the contrary, if the regulating pin 49b is spaced further from the side edge 27b of the swingable speed regulating lever 27, as compared with the preceding case, the time interval from the start of the leading shutter member A to the actuation of the succeeding shutter member B increases, and accordingly the aforesaid width of the exposing slit becomes larger, resulting in a lower shutter speed. Furthermore, if the cam member 50 for shutter speed regulation is so positioned as to keep the regulating pin 49a of the shutter speed regulating lever 49 in contact with the linear portion 50b of the cam member 50, the distance between the side edge 27b of the swingable speed regulating lever 27 and the regulating pin 49b of the shutter speed regulating lever 49 increases to its maximum. With such large distance between the side edge 27b and the regulating pin 49b, the side edge 27b never comes into engagement with the regulating pin 49b when the swingable speed regulating lever 27 is rotated around the pin 44 by the actuating lever 22 through the biased end 27a driven by the lower end 22b of the driving lever 22, so that the actuating lever 43 is never actuated and the succeeding shutter member B is not actuated thereby. However, the succeeding shutter member B is actuated through a different route, i.e. upon the arrival of the leading shutter member A at its uppermost position, the member A strikes the bent portion 15a of the lock lever 15 to rotate the lever clockwise, as seen in FIG. 4, and the flywheel 14 is released to rotate counterclockwise by the elasticity of the coiled spring 52 for turning the link lever 55 clockwise, until the lower end 55a of the link lever urges the biased end 40b of the stop lever for turning the stop arm 40 and releasing the engagement between the stop arm 40 and the succeeding shutter member B to allow the movement of the latter.

Now, the description will be made on the behavior of the rotary shutter, according to the present invention, after the counterclockwise (as seen in FIG. 3) rotation of the succeeding shutter member B by the spring 6. There are two types of behaviors. One is related to the case when the regulating pin 49b of the shutter speed regulating lever 49 is positioned close to the side edge 27b of the swingable speed regulating lever 27 (high shutter speed), and in this case the aforesaid shutter speed stabilizing mechanism operates. In other words, when the succeeding shutter member B is actuated by the spring 6 immediately after the start of the rotation of the leading shutter member A, the claw member 10 rotates clockwise, as seen in FIG. 2, by means of the spring 10c, and the claw 10a of the claw member 10 engages one of the notches 9a of the leaf spring 9 secured to the leading shutter member 9, so as to connect the leading shutter member A and the succeeding shutter member B into a joint unit. Thus, the aforesaid width of the exposing slit formed by the two shutter members A and B is fixed at a certain selected value, and the exposing slit moves clockwise or generally upwards, as seen in FIG. 3, until the leading shutter member A passes through the path of the light beam leading to the film, when the pin 16 secured to the shutter housing 1 engages the leaf spring 9 to urge the latter toward the axis of rotation, i.e. the shaft 2. Thus, the notches 9a of the leaf spring 9 leaves the claw 10a of the claw member 10, so that the succeeding shutter member B is separated from the leading shutter member A and continues its counterclockwise rotation (as seen in FIG. 3) until the pin 7a secured to the weight piece 7 secured to the succeeding shutter member B strikes the bounding lever 20 when the path of the light beam to the film is completely interrupted by the succeeding shutter member B.

The other type behavior is related with a comparatively low shutter speed, i.e. the case in which the regulating pin 49b is spaced from the side edge 27b of the swingable speed regulating lever 27 in excess of a certain predetermined limit. In this case, the actuation of the succeeding shutter member B is delayed by a comparatively long period of time after the start of the leading shutter member A, and hence, when the claw member rotates, the leading shutter member A is already in the proximity of its uppermost position with the leaf spring 9 urged by the pin 16 toward the shaft 2, as shown in FIG. 3, so that the claw 10a of the claw member 10 never engages the notch 9a of the leaf spring 9. Thus, the succeeding shutter member B travels to its own uppermost position without being integrally connected to the leading shutter member A, as if there were either claw member 10 or leaf spring 9. Such behavior for low shutter speed is allowed because the shutter speed is comparatively stable in low shutter speed range.

When the pin 7a secured to the weight member 7 of the succeeding shutter member B strikes the bent portion 20b of the bounding lever 20 to turn the lever 20 clockwise, as seen in FIG. 1, the pin 20a (FIGS. 1 and 4) forces the stopper plate 19 to rotate around the pin 19a against the elasticity of the spring 18 to release the engagement of the stopper plate 19 with the stopper lever 24, so as to allow the movement of the stopper lever 24 and the driving lever 22 as an integral unit. Thus, the stopper lever and the driving lever are forced to rotate together around the shaft 23 by the return spring 12, actuating both shutter members A and B, and the bias spring 38 of the link lever 39, until the upper end of the driving lever 22 engages the edge 1d of the opening 1c of the shutter housing 1. Thus, the quick return of both the leading shutter member A and the succeeding shutter member B is effected. At this time, the link lever 39 is also actuated by the pin 24a due to the disengagement of the stopper plate 19 from the stopper lever 24, so that the detect member 33 and the probe 33a thereof are forced to move away from the perforation 32a of the film 32 by the engagement between the bent portion 33b and the link lever 39, and hence a signal indicating the capableness of film feeding can be delivered to a film feeding mechanism (not shown).

The shutter charging operation will now be described. The driving lever 22 is turned counterclockwise (as seen in FIG. 1) by a suitable means around the contact point between the top end 22a of the driving lever 22 and the edge 1d of the opening 1c of the shutter housing 1, against the elasticity of the driving spring 26, and hence the stopper lever 24 having the pin 25 rotates clockwise around the shaft 23 to bring the stopper lever 24 into engagement with the stopper plate 19, and at the same time the driving lever 22 engages the bent portion 30a of the release lever 30. Thus, the initial conditions of FIG. 1 are substantially resumed. In this process, the link lever 39 rotates counterclockwise, as seen in FIG. 1, and moves away from the bent portion 33a of the detect member 33, and hence, the spring 34 urges the detect member 33 towards the film 32. When a perforation 32a comes in front of the probe 33a, the tip of the probe 33a fits in the perforation by moving further leftwards, as seen in FIG. 1, and at the same time a signal is given to the film feeding mechanism to stop the feeding of the film. During the aforesaid shutter charging process, the lower end 22b forces the biased end 27a of the swingable speed regulating lever 27 against the elasticity of the coiled spring 45, as can be seen from FIG. 2, so that the lever 27 rotates clockwise around the pin 44. As a result of it, the free end 27c of the swingable speed regulating lever 27 urges the lower end 55a of the link lever 55 connected to the flywheel 14, so as to turn the link lever 55 counterclockwise around the shaft 56, as seen in FIG. 4, to effect the locking engagement between the flywheel 14 and the lock lever 15. At the same time the stop arm 40 is also rotated by the coiled spring 42 around the shaft 41, and engages the lug 7a of the weight piece 7 of the succeeding shutter member B to stop the shutter member B. Thus, the rotary mirror shutter is set ready for the next shuttering operation.

The relation between the claw 10a of the claw member 10 and the notches 9a of the leaf spring 9, usable in the shutter according to the present invention, will now be described in further detail. The configuration of the notches 9a of the leaf spring 9 is so selected that the leading shutter member A fulfills one of the following conditions with respect to the succeeding shutter member B when the claw 10a of the claw member 10 engages the notch 9a.

1. one-way engagement, allowing the movement of the two shutter members while retaining the one-way engagement.
2. two-way engagement, allowing the movement of the two shutter members while retaining the two-way engagement.
3. two-way relief, capable of producing a predetermined frictional force and capable of allowing the movement of the two shutter members while retaining the two-way engagement.

The series of the notches 9a may be formed either:
4. uniformly at the same pitch, or
5. in steps for preselected series of shutter speeds (e.g. one five-hundredths, one two-hundred-fiftieths, ...).

To achieve the desired shutter speeds regardless of the angular posture of the camera,
6. both the leading shutter member and the succeeding shutter member may have the same velocity, or
7. either of the two shutter members A and B has a higher velocity than that of the other.

By selecting a suitable combination of the conditions out of the preceding seven items, the width of the slit formed by the leading shutter member A and the succeeding shutter member B can be kept constant or at a value near constant during the shuttering operation, by means of the mutual action between the claw member 10 and the leaf spring 9.

It is apparent to those skilled in the art that the combination of the leaf spring 9 and the claw member 10, described hereinbefore referring to a preferred embodiment of the present invention, can be replaced with any suitable equivalent mechanism: for instance, the substitution of the leaf spring 9 of the leading shutter member A with a spring-biased swingable lever, the substitution of the rotational movement of the claw member 10 of the succeeding shutter member B with a sliding movement, the interchange of the location of the claw member and the leaf spring by forming a combination of a claw member secured to the leading shutter member A and a swingable lever secured to the succeeding shutter member B and provided with notches engageable with the claw member, etc.

As described in the foregoing, with the rotary mirror shutter, according to the present invention, by mounting a suitable weight piece 7 at the lower end of the succeeding shutter member B, it is made possible to achieve simultaneously the similar velocities of the two shutter members A, B and the application of a large impulsive force to the bounding lever 20. The similar velocities of the two shutter members A, B are achieved by providing similar moments of inertia to them by using the aforesaid weight piece 7. The weight piece 7 has further advantage in forming a mechanically strong and stable base for mounting a lug 7a to hold the actuation of the succeeding shutter member B for a selected time lag period after the start of the leading shutter member A as well as for mounting a pin 7b to apply the aforesaid impulsive force to the bounding lever 20.

The succeeding shutter member B, usable in the shutter according to the present invention, has additional advantages in that the bounding movement of the shutter member B itself at the end of its shuttering motion is minimized by delivering most of its kinetic energy to the bounding lever 20 at the end of the movement for effecting quick return, and that the risk of double exposure to the film due to the bounding of the succeeding shutter member B is eliminated by compensating the effects of the bounce of the shutter member B by the movement of the leading shutter member A, which is caused by the actuation of the bounding lever 20 effecting the disengagement of the stopper lever 24 from the stopper plate 19, as described above in detail.

Furthermore, in contrast to known rotary mirror shutters having complicated shutter speed regulating means disposed in conjunction with the driving mechanism on one side surfaces of its casing, corresponding to the aforesaid shutter housing 1, the present invention provides a novel rotary mirror shutter having a shutter speed regulating means mounted on the less crowded bottom surface of the shutter housing 1 while disposing the driving mechanism on a different side surface thereof, so that the overall construction of the rotary mirror shutter is greatly simplified. The shutter speed regulating means usable in the rotary mirror shutter of the present invention is very simple with only few parts, such as two levers 27, 43 and a regulating pin 49b, and yet capable of carrying out accurate calculation of the delay time from the start of the leading shutter member A to the actuation of the succeeding shutter member B.

Moreover, according to the present invention, the shutter speed is greatly stabilized for high shutter speed settings, by providing a novel shutter speed stabilizing means, which keeps the width of the exposing slit formed by the leading and succeeding shutter members A, B either constant or at a value near constant during each shuttering operation, by means of the combination of a claw member 10 and a leaf spring 9, and hence the width of the exposing slit is not affected by the variation of the angle at which the gravity acts on the shutter, i.e. the angular posture of the camera, which has been noticed in known rotary mirror shutter having independent leading and succeeding shutter members. In the known rotary mirror shutter the two shutter members are affected by the gravity independently and possibly differently. Moreover, the stability of the shutter speed can be further improved by reducing the gravity-caused variations of the velocities of the two shutter members connected in the aforesaid manner by a suitable means, such as superimposed means (not shown) mounted on the actuating lever 22 at a position opposite to the lower end 22b with respect to the pin 25. With the construction of the shutter speed regulating means and shutter operating mechanism, according to the present invention, the actual shutter speed is very little affected by the change in any of the aforesaid factors affecting the velocity of the leading and succeeding shutter members, such as the mass of each member, the strength of the driving force source, air pressure, and friction in the movable parts. Accordingly, the adjustment of parts of the shutter affecting such factors is greatly simplified.

In the illustrated embodiment, the pin 16 for releasing the engagement between the leaf spring 9 and the claw member 10 is adapted to act on the leaf spring 9 when the leading shutter member A has passed the path of the light beams, the pin 9 can be easily modified to act simultaneously as a flash photographing contact X, by electrically insulating the pin 16 from the rest of the shutter box 1. In this case, the pin 16 is connected to one terminal of an electric power source, while the opposite terminal thereof is connected to the return spring 12.

It is a feature of the rotary mirror shutter of the present invention that it can be effectively used as a mirror shutter of a monocular reflex camera using magazine-mounted films. The increased spatial limitation caused by film cartridge chambers of the magazine is met by disposing the shutter speed regulating means of the shutter at the less crowded space below the light-intercepting drum. In known rotary mirror shutters, the shutter speed regulating means is disposed in the proximity of the rotary shaft of the shutter to make the side walls congested with various parts and the overall mechanism very complicated. In the rotary mirror shutter of the invention, the number of the parts to be disposed on the side walls and in the proximity of the film is minimized, and accordingly, the overall construction is kept very simple.

With the rotary mirror shutter, according to the present invention, it is possible to provide the full-open even when magazine-mounted films are used. Light-intercepting ribs, extending between the two film cartridge chambers and extending at right angles with the plane of the film, act to limit the operating angle of the rotating members of the shutter, as compared with conventional nonmagazined films. In a camera using a large lens or requiring as large opening of the shutter as possible while allowing the interchange of various type lenses, it is very difficult to achieve the full-open of the shutter unless the idea of the present invention is adopted, which includes the elimination of the use of the slow governor and the control of the actuating time of the succeeding shutter member in response to operative angular position of the leading shutter member. In other words, with the known rotary mirror shutter, there is a limit in the maximum rotation angle of the leading shutter member, due to the fact that the light-intercepting drum of the succeeding shutter member should be shortened to provide space necessary for receiving the ribs of the magazine, and the leading shutter member should be able to keep the light-proofness when the thus shortened succeeding shutter member comes to its uppermost position. The thus limited operative angle of the leading shutter member makes it difficult to provide sufficient kinetic energy for releasing the engagement with the succeeding shutter member upon crossing of the path of the light beams to the film. Nevertheless, most cameras using magazine-mounted films are required to be capable of operation with auxiliary light sources such as flash bulbs and electronic flashes. The lack of ability of full-open of the shutter presents a serious drawback. In the rotary mirror shutter according to the present invention, the full-open is achieved by providing a special means for releasing the succeeding shutter member in addition to the aforesaid shutter speed regulating means. More particularly, a flywheel, acting as a delay means to enable the full-open, is provided, and a lock lever to hold the flywheel is disposed in the proximity of the uppermost point of the locus of movement of the leading shutter member, so that as soon as the leading shutter passes across the path of the light beams to the film, the lock lever is actuated to release flywheel to allow the latter to act, either directly or indirectly, on a stop arm holding the operation of the succeeding shutter lever.

In addition, the rotary mirror shutter, according to the present invention, can be used in a monocular reflex camera using magazine-mounted films, so as to effectively utilize the space within the camera limited by the film cartridge chambers of the magazine, and yet the construction of the shutter is simple with minimum number of parts. The shutter speed can be, of course, changed freely, and the full-open operation is possible for auxiliary light sources, such as flash bulbs and electronic flash. The film detect member incorporated in the shutter according to the present invention is free from troubles due to vibration of the film surface when the film detect member leaves the film perforation, so that highly stable and reliable film detect signal can be transferred to the film feeding mechanism, and the provision of such film detect member addition to other related parts does not cause any difficulty.

More particularly, in the rotary mirror shutter according to the present invention, the film detect operation is carried out in conjunction with the shutter quick return operation, to produce a stable and reliable film detect signal, and thereby, the shutter of the present invention has overcome the difficulties experienced with known film detect members for magazine-mounted films at the time of locating the perforations and at the time of shutter operation.

Although the present invention has been described with a certain degree of particularlity, it is understood that the present disclosure has been made only by way of example and that numerous changes in the details of contruction and the combination and arrangement of parts may be resorted to without departing from the spirit and the scope of the invention as hereinafter claimed.

We claim:

1. A rotary mirror shutter having a shutter housing including a leading shutter member and a succeeding shutter member having light-intercepting drum to be actuated with a delay from the start of said leading shutter member, both members mounted on a shaft of the housing, said leading shutter member consisting of another light-intercepting drum with a mirror mounted at the top thereof, characterized in that one side wall of said shutter housing has a driving lever pivotally mounted thereon for driving said leading shutter member and a stop lever pivotally mounted thereon for actuating shutter quick return operation, said stop lever operatively engaged with said driving lever and adapted to be released upon completion of the rotation of said shutter members, and that the bottom wall of the shutter housing has a stop arm movably mounted thereon for holding the actuation of said succeeding shutter member after the start of said leading shutter member and a shutter speed regulating means operatively mounted thereon for regulating shutter speed, said shutter speed regulating means adapted to release said holding of said succeeding shutter member by means of said stop arm at a moment corresponding to a predetermined shutter speed.

2. A rotary mirror shutter as set forth in claim 1, characterized in that said succeeding shutter member has a weight piece mounted at the lower end thereof and a pin secured to said weight piece or directly to said succeeding shutter member, said pin adapted to release said stop lever holding a shaft of said driving lever of said leading shutter member when said succeeding shutter member passes across an optical path of light beams exposing a film, whereby quick return of the shutter is caused.

3. A rotary mirror shutter as set forth in claim 1, characterized in that an actuating lever is provided for actuating said stop arm related to said succeeding shutter member, that a swingable speed regulating lever adapted to follow the movement of said driving lever is pivotally mounted on said actuating lever, and that a regulating pin is provided with an adjustable spacing from said swingable speed regulating lever, whereby the time delay from the start of said leading shutter member to the release of said stop arm related to said succeeding shutter member is determined by the position of said regulating pin so as to vary the shutter speed.

4. A rotary mirror shutter as set forth in claim 1, characterized in that a shutter speed stabilizing means is provided which comprises a claw member mounted on said succeeding shutter member at a position not interfering with an optical path of light beams exposing a film, a leaf spring with notches engageable with said claw member and mounted on said leading shutter member at a position not interfering with said optical path, a means to cause engagement between said claw and said leaf spring, and another means for disengaging said leaf spring from claw, whereby said claw is brought into engagement with one of said notches by said engaging means as soon as said succeeding shutter member actuates responsive to the release of said stop arm so as to keep at a constant or a value near constant the width of a slit formed by said leading and said succeeding shutter members and said claw is disengaged from said notch by said disengaging means when said leading shutter member passes across said optical path to free said width of said slit, and the film exposure is completed when said succeeding shutter member passes across said optical path.

5. A rotary mirror shutter as set forth in claim 1, characterized in that the opposing side wall of the shutter housing has a delay means for delaying said release of said stop arm from said succeeding shutter member, said delay means withheld from actuation by a lock lever and released from the lock lever when said leading shutter member arrives at its uppermost position.

6. A rotary mirror shutter as set forth in claim 1, characterized in that said shutter housing has a film perforation detecting means mounted on the side wall opposing said driving lever, said film perforation detecting means being operatively connected to said stop lever related to quick return operation.